(12) United States Patent
Barve et al.

(10) Patent No.: US 10,697,344 B2
(45) Date of Patent: Jun. 30, 2020

(54) SYSTEMS AND METHODS FOR DETERMINING DIFFERENTIAL AND RELATIVE PRESSURE USING A CONTROLLER

(71) Applicant: Cummins Emission Solutions Inc., Columbus, OH (US)

(72) Inventors: Aaditya Barve, Ujjain (IN); Kwadwo O. Owusu, Greenwood, IN (US)

(73) Assignee: Cummins Emission Solutions Inc., Columbus, IN (US)

(*) Notice: Subject to any disclaimer, the term of this patent is extended or adjusted under 35 U.S.C. 154(b) by 13 days.

(21) Appl. No.: 16/040,116

(22) Filed: Jul. 19, 2018

(65) Prior Publication Data
US 2020/0025054 A1    Jan. 23, 2020

(51) Int. Cl.
| | |
|---|---|
| *F01N 3/021* | (2006.01) |
| *F01N 9/00* | (2006.01) |
| *F01N 11/00* | (2006.01) |
| *B01D 37/04* | (2006.01) |
| *B01D 46/00* | (2006.01) |
| *G01L 15/00* | (2006.01) |

(52) U.S. Cl.
CPC .......... *F01N 11/002* (2013.01); *B01D 37/046* (2013.01); *B01D 46/0086* (2013.01); *F01N 3/021* (2013.01); *F01N 9/002* (2013.01); *G01L 15/00* (2013.01); *B01D 2258/01* (2013.01); *F01N 2560/08* (2013.01); *F01N 2900/0416* (2013.01); *F01N 2900/1406* (2013.01); *F01N 2900/16* (2013.01)

(58) Field of Classification Search
CPC .... F01N 3/021; F01N 11/002; F01N 2560/08; F01N 2900/1406; F01N 2900/16; B01D 37/046; B01D 46/0086; G01L 15/00
See application file for complete search history.

(56) References Cited

FOREIGN PATENT DOCUMENTS

| | | | | |
|---|---|---|---|---|
| FR | 2884862 A1 | * | 10/2006 | ............. F01N 3/023 |
| JP | 2002364342 A | * | 12/2002 | |
| JP | 2008111409 A | * | 5/2008 | |

* cited by examiner

*Primary Examiner* — Audrey K Bradley
(74) *Attorney, Agent, or Firm* — Foley & Lardner LLP

(57) ABSTRACT

An aftertreatment system comprises a housing defining an internal volume. A filter is disposed in the housing and configured to remove particulate matter included in the exhaust gas. A delta pressure sensor configured to measure an inlet apparent pressure value upstream of the filter. An ambient pressure sensor separate from the delta pressure sensor is configured to measure an ambient pressure value of an ambient environment in which the aftertreatment system is located. A controller is configured to receive the inlet apparent pressure value, receive the ambient pressure value from the ambient pressure sensor, determine a relative inlet exhaust pressure value based upon the inlet apparent pressure value and the ambient pressure value, and adjust an exhaust flow rate of the exhaust gas based at least on the relative inlet exhaust pressure value.

20 Claims, 7 Drawing Sheets

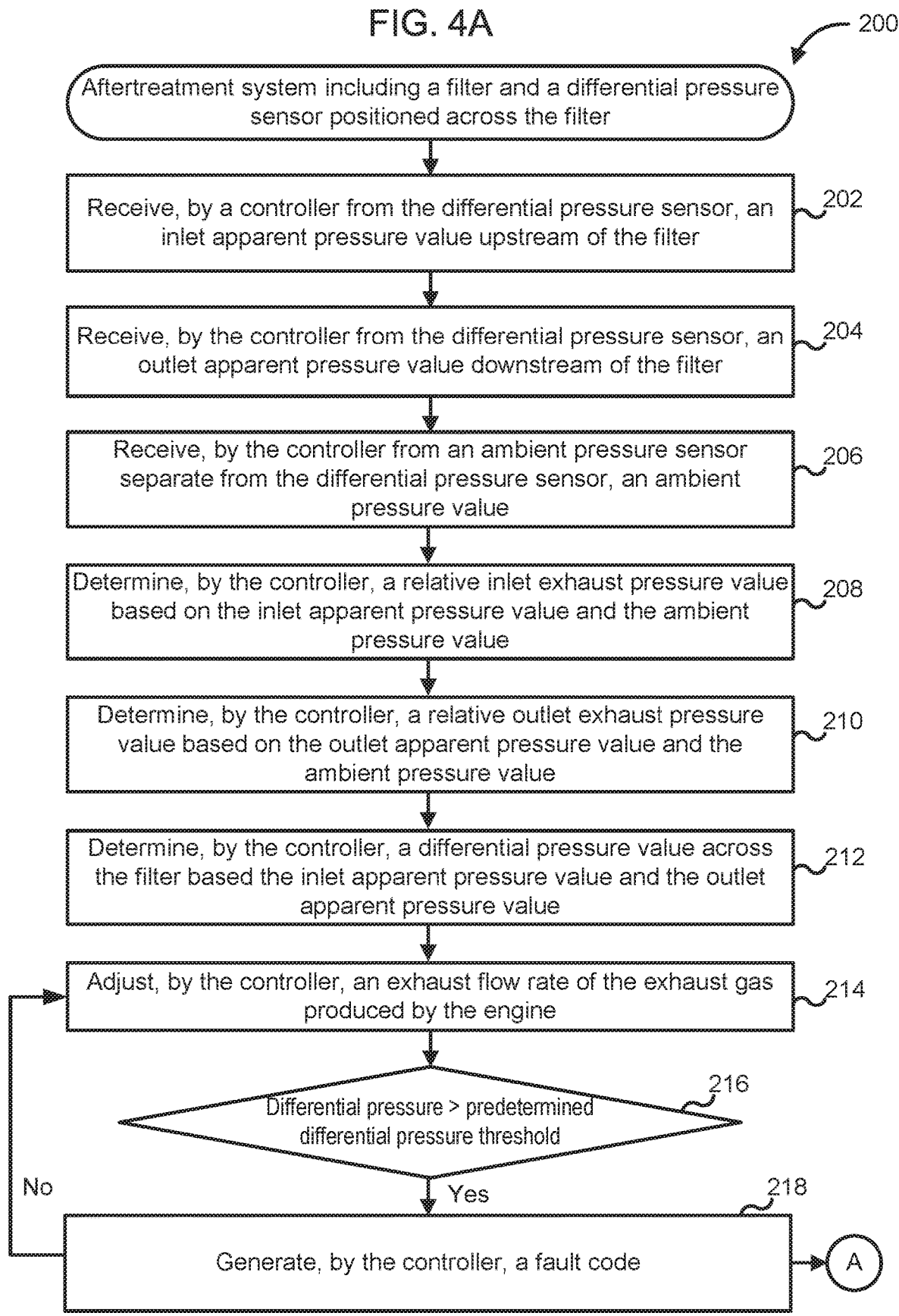

SYSTEMS AND METHODS FOR DETERMINING DIFFERENTIAL AND RELATIVE PRESSURE USING A CONTROLLER

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems comprise any of several different components to reduce the levels of harmful exhaust emissions present in exhaust gas. For example, certain exhaust gas aftertreatment systems for diesel-powered IC engines comprise a selective catalytic reduction (SCR) system, including a catalyst formulated to convert NOx (NO and $NO_2$ in some fraction) into harmless nitrogen gas ($N_2$) and water vapor ($H_2O$) in the presence of ammonia ($NH_3$). Aftertreatment systems may also include a filter such as a partial flow filter, configured to remove particulate matter (e.g., soot, dust, debris, etc.) from the exhaust gas. Some aftertreatment systems generally include a delta pressure sensor configured to measure a differential pressure across the filter, a relative inlet exhaust pressure value and a relative outlet exhaust pressure value. Such delta pressure sensors can increase downtime of the aftertreatment system and increase maintenance costs.

SUMMARY

Embodiments described herein relate generally to systems and methods for determining various pressures in an aftertreatment system using a controller coupled to a delta pressure sensor, and in particular, to a controller configured to determine a differential pressure, and relative inlet and outlet exhaust pressures of an exhaust gas flowing through a filter of an aftertreatment system using signals received from a delta pressure sensor that does not include an opening for ambient air.

In some embodiments, an aftertreatment system configured to reduce constituents of an exhaust gas produced by an engine comprises a housing defining an internal volume. The housing has an inlet configured to receive the exhaust gas and an outlet configured to expel treated exhaust gas. A filter is disposed in the housing. The filter is configured to remove particulate matter included in the exhaust gas. A delta pressure sensor is configured to measure an inlet apparent pressure value of the exhaust gas upstream of the filter. The aftertreatment system also comprises an ambient pressure sensor separate from the delta pressure sensor. The ambient pressure sensor is configured to measure an ambient pressure value of an ambient environment within which the aftertreatment system is located. A controller is communicatively coupled to the delta pressure sensor and the ambient pressure sensor. The controller is configured to receive the inlet apparent pressure value from the delta pressure sensor, receive the ambient pressure value from the ambient pressure sensor, determine a relative inlet exhaust pressure value based upon the inlet apparent pressure value and the ambient pressure value, and adjust an exhaust flow rate of the exhaust gas based at least on the relative inlet exhaust pressure value.

In some embodiments, a pressure determination system comprises a delta pressure sensor configured to be positioned on an aftertreatment system comprising at least a filter. The delta pressure sensor is configured to measure an inlet apparent pressure value of the exhaust gas upstream of the filter. The pressure determination system also comprises an ambient pressure sensor separate from the delta pressure sensor. The ambient pressure sensor is configured to measure an ambient pressure value of an ambient environment within which the aftertreatment system is located. A controller is communicatively coupled to the delta pressure sensor and the ambient pressure sensor. The controller is configured to receive the inlet apparent pressure value from the delta pressure sensor, receive the ambient pressure value from the ambient pressure sensor, determine a relative inlet exhaust pressure value based upon the inlet apparent pressure value and the ambient pressure value, and adjust an exhaust flow rate of the exhaust gas based at least on the relative inlet exhaust pressure value.

In some embodiments, a method for determining various pressures of an exhaust gas flowing through an aftertreatment system that comprises a filter and a delta pressure sensor comprises receiving, by a controller from the delta pressure sensor, an inlet apparent pressure value of the exhaust gas upstream of the filter. The controller receives from an ambient pressure sensor, an ambient pressure value of an ambient environment in which the aftertreatment system is located. The controller determines a relative inlet exhaust pressure value based upon the inlet apparent pressure value and the ambient pressure value. The controller adjusts an exhaust flow rate of the exhaust gas based at least on the relative inlet exhaust pressure value.

In some embodiments, a pressure determination system comprises a first apparent pressure sensor positioned upstream of a filter of an aftertreatment system and configured to measure an inlet apparent pressure value of the exhaust gas upstream of the filter. An ambient pressure sensor separate from the first apparent pressure sensor is configured to measure an ambient pressure value of an ambient environment within which the aftertreatment system is located. A controller is communicatively coupled to the first pressure sensor and the ambient pressure sensor. The controller is configured to receive the inlet apparent pressure value from the first apparent pressure sensor, receive the ambient pressure value from the ambient pressure sensor, determine a relative inlet exhaust pressure value based upon the inlet apparent pressure value and the ambient pressure value, and adjust an exhaust flow rate of the exhaust gas based at least on the relative inlet exhaust pressure value.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

FIG. 4A-B is a schematic flow diagram of a method for determining various pressures of an exhaust gas flowing across a filter of an aftertreatment system using a controller, according to an embodiment.

Figure 1A:
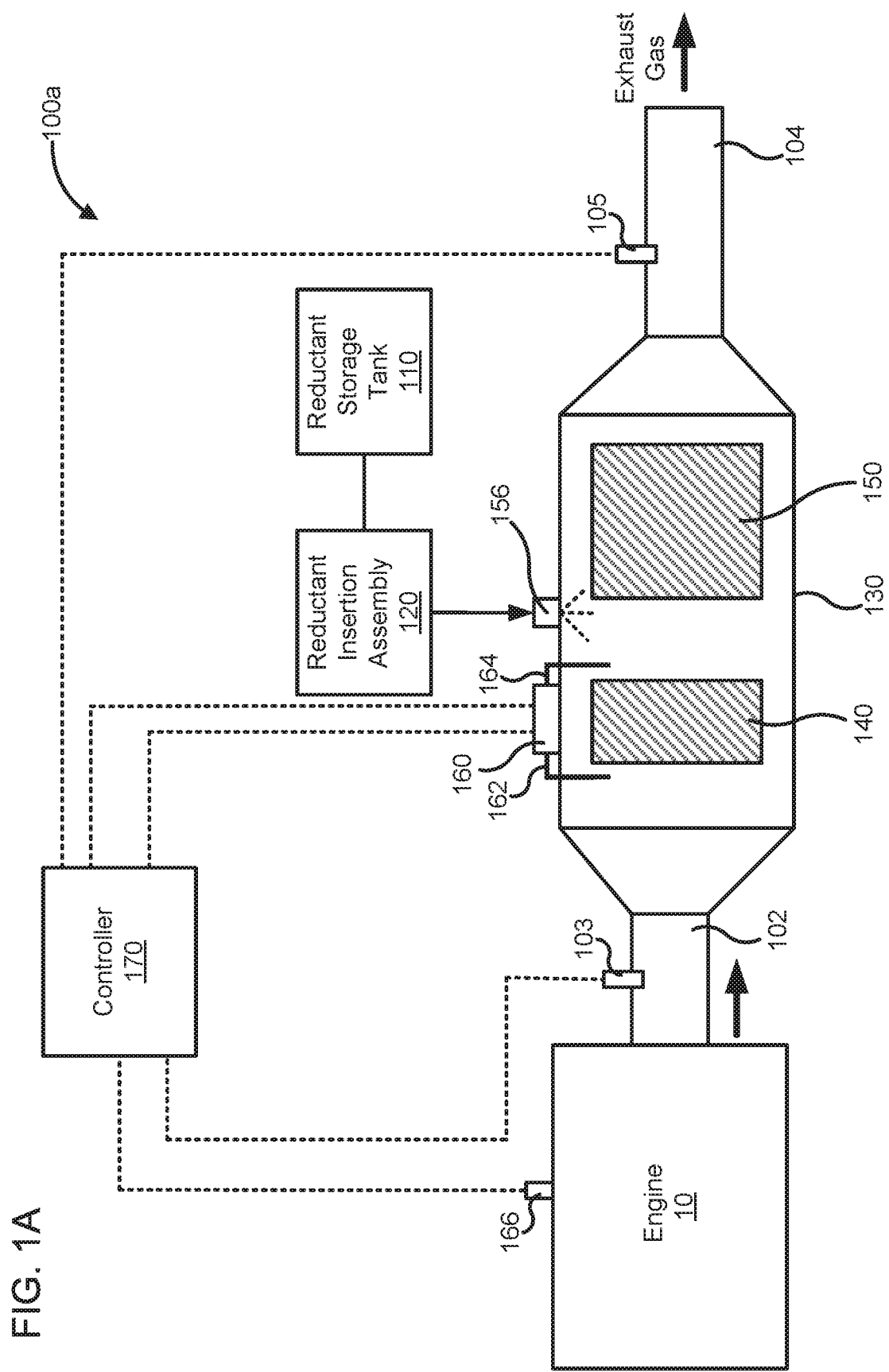
FIG. 1A is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to systems and methods for determining various pressures in an aftertreatment system using a controller coupled to a delta pressure sensor, and in particular, to a controller configured to determine a differential pressure, and relative inlet and outlet exhaust pressures of an exhaust gas flowing through a filter of an aftertreatment system using signals received from a delta pressure sensor that does not include an opening for ambient air.

Aftertreatment systems may also include a filter such as a partial flow filter, configured to remove particulate matter (e.g., soot, dust, debris, etc.) from the exhaust gas. Some aftertreatment systems generally include a delta pressure sensor configured to measure a differential pressure across the filter, a relative inlet exhaust pressure value and a relative outlet exhaust pressure value. Such delta pressure sensors may fail which can increase downtime of the aftertreatment system and increase maintenance costs.

Expanding further, conventional delta pressure sensors are generally configured to measure an inlet gauge pressure at an upstream port of the delta pressure sensor corresponding to the pressure of the exhaust gas entering a filter, and an outlet gauge pressure at a downstream port of the delta pressure sensor (e.g., at an outlet of the filter) corresponding to the pressure of the exhaust gas exiting the filter. Such delta pressure sensors generally include onboard circuitry positioned within a sensor housing of the delta pressure sensor. The onboard circuitry is configured to determine a differential pressure across the filter based upon the inlet pressure and the outlet pressure. Furthermore, such delta pressure sensors also include an ambient pressure sensor. A port is generally defined in the sensor housing of such delta pressure sensors and configured to allow ambient air to be communicated therethrough into the sensor housing so as to allow the inlet and outlet gauge pressure sensors to determine the inlet and outlet gauge pressures, respectively relative to the ambient pressure of ambient air of the environment in which the aftertreatment system is located. The ambient pressure is then used to determine relative inlet and relative outlet exhaust pressures based on the inlet and outlet pressures, respectively. The onboard circuitry may then communicate the calculated differential pressure, relative inlet and relative outlet exhaust pressure values to a controller of the aftertreatment system or a central controller (e.g., an engine control module).

To protect the onboard circuitry and other components of the delta pressure sensor from moisture, dust or particulate matter included in the ambient air, conventional delta pressure sensors generally include a sensor filter disposed on the port to remove particulate matter from the ambient air entering the sensor housing. Furthermore, a dehydrating gel (e.g., a silica gel) may also be positioned on the opening or within the sensor housing for removing moisture from the ambient air. However, the filter and gel can fail which may result in damage to the internal components, for example, due to hot exhaust gas entering the port instead of ambient air. Therefore, a mounting orientation of such conventional delta pressure sensors has to be carefully controlled to prevent accidental exposure to exhaust gas. Furthermore, the onboard circuitry included in conventional delta pressure sensors has much lesser processing power and therefore, is significantly slower relative to a controller of the aftertreatment system or an engine control module.

Various embodiments of the systems and methods described herein provide benefits including, for example: (1) eliminating an ambient air port from delta pressure sensors, thereby preventing exposure of the internal components of the delta pressure sensor from particles and moisture; (2) allowing mounting of the delta pressure sensor at any orientation without concern of the hot exhaust gas from entering a sensor housing of the delta pressure sensor; (3) determining differential pressure across a filter, a relative inlet exhaust pressure and a relative outlet exhaust pressure using a controller of the aftertreatment system instead of an onboard circuitry of the delta pressure sensor allowing faster data processing and faster response times; and (4) reduce manufacturing costs by eliminating sensor subcomponents as well as reducing maintenance costs by reducing failure rates of the delta pressure sensor.

FIG. 1A is a schematic illustration of an aftertreatment system 100a, according to an embodiment. The aftertreatment system 100a is configured to receive an exhaust gas from an engine 10 (e.g., a diesel engine, a gasoline engine, a natural gas engine, a dual fuel engine, a biodiesel engine, an E-85 engine, or any other suitable engine) and reduce constituents of the exhaust gas such as, for example, NOx gases, CO, hydrocarbons, etc. The aftertreatment system 100a may comprise a reductant storage tank 110, a reductant insertion assembly 120, a housing 130, a filter 140, a delta pressure sensor 160, a controller 170 and may also include a SCR catalyst 150.

The housing 130 defines an internal volume within which the filter 140 and the SCR catalyst 150 are positioned. The housing 130 may be formed from a rigid, heat-resistant and corrosion-resistant material, for example stainless steel, iron, aluminum, metals, ceramics, or any other suitable material. The housing 130 may have any suitable cross-section, for example circular, square, rectangular, oval, elliptical, polygonal, or any other suitable shape.

An inlet conduit 102 is fluidly coupled to an inlet of the housing 130 and structured to receive exhaust gas from the engine 10 and communicate the exhaust gas to an internal volume defined by the housing 130. Furthermore, an outlet conduit 104 may be coupled to an outlet of the housing 130 and structured to expel treated exhaust gas into the environment (e.g., treated to remove particulate matter such as soot by the filter 140 and/or reduce constituents of the exhaust gas such as NOx gases included in the exhaust gas).

A first sensor 103 may be positioned in the inlet conduit 102. The first sensor 103 may comprise a NOx sensor configured to measure an amount of NOx gases included in the exhaust gas flowing into the SCR catalyst 150 and may include a physical NOx sensor or a virtual NOx sensor. In various embodiments, a temperature sensor, a pressure sensor, an oxygen sensor or any other sensor may also be positioned in the inlet conduit 102 so as to determine one or more operational parameters of the exhaust gas flowing through the housing 130 of the aftertreatment system 100a.

A second sensor 105 may be positioned in the outlet conduit 104. The second sensor 105 may comprise a second NOx sensor configured to determine an amount of NOx gases expelled into the environment after passing through the SCR catalyst 150. In other embodiments, the second sensor 105 may comprise a particulate matter sensor configured to determine an amount of particulate matter (e.g., soot included in the exhaust gas exiting the filter 140). In still other embodiments, the second sensor 105 may comprise an ammonia sensor configured to measure an amount of ammonia in the exhaust gas flowing out of the SCR catalyst 150, i.e., determine the ammonia slip. This may be used as a measure of determining a catalytic efficiency of the SCR catalyst 150, adjust an amount of reductant to be inserted into the SCR catalyst 150, and/or adjust a temperature of the SCR catalyst 150 so as to allow the SCR catalyst 150 to effectively use the ammonia for catalytic decomposition of the NOx gases included in the exhaust gas flowing therethrough. An ammonia oxide (AMOx) catalyst may be positioned downstream of the SCR catalyst 150, for example, in the outlet conduit 104 so as to decompose any unreacted ammonia in the exhaust gas downstream of the SCR catalyst 150.

The filter 140 is configured to remove particulate matter (e.g., soot, debris, inorganic particles, etc.) from the exhaust gas. In various embodiments, the filter 140 may include a ceramic filter. In particular embodiments, the filter 140 may include a partial flow filter (e.g., a ceramic partial filter). In other embodiments, the filter 140 may include a metallic partial flow filter. In still other embodiments, the filter 140 may include a cordierite filter which can, for example, be an asymmetric filter. In yet other embodiments, the filter 140 may be catalyzed.

The SCR catalyst 150 is formulated to decompose constituents of an exhaust gas flowing therethrough. In some embodiments, the SCR catalyst 150 may comprise a selective catalytic reduction filter (SCRF), or any other aftertreatment component configured to decompose constituents of the exhaust gas (e.g., NOx gases such as such nitrous oxide, nitric oxide, nitrogen dioxide, etc.), flowing through the housing 130 in the presence of a reductant, as described herein.

Any suitable SCR catalyst 150 may be used such as, for example, platinum, palladium, rhodium, cerium, iron, manganese, copper, vanadium based catalyst, any other suitable catalyst, or a combination thereof. The SCR catalyst 150 may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 150. Such washcoat materials may comprise, for example, aluminum oxide, titanium dioxide, silicon dioxide, any other suitable washcoat material, or a combination thereof. The exhaust gas (e.g., diesel exhaust gas) can flow over and/or about the SCR catalyst 150 such that any NOx gases included in the exhaust gas are further reduced to yield an exhaust gas which is substantially free of NOx gases.

Although FIG. 1A, shows only the filter 140 and the SCR catalyst 150 positioned within the internal volume defined by the housing 130, in other embodiments, a plurality of aftertreatment components may be positioned within the internal volume defined by the housing 130 in addition to the filter 140 and the SCR catalyst 150. Such aftertreatment components may comprise, for example, oxidation catalysts (e.g., carbon monoxide, hydrocarbons and/or ammonia oxidation catalysts), mixers, baffle plates, secondary filters (e.g., a secondary partial flow or catalyzed filter) or any other suitable aftertreatment component.

A reductant port 156 may be positioned on a sidewall of housing 130 and structured to allow insertion of a reductant therethrough into the internal volume defined by the housing 130. The reductant port 156 may be positioned upstream of the SCR catalyst 150 (e.g., to allow reductant to be inserted into the exhaust gas upstream of the SCR catalyst 150) or over the SCR catalyst 150 (e.g., to allow reductant to be inserted directly on the SCR catalyst 150). In other embodiments, the reductant port 156 may be disposed on the inlet conduit 102 and configured to insert the reductant into the inlet conduit 102 upstream of the SCR catalyst 150. In such embodiments, mixers, baffles, vanes or other structures may be positioned in the inlet conduit 102 so as to facilitate mixing of the reductant with the exhaust gas.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 120 is fluidly coupled to the reductant storage tank 110. The reductant insertion assembly 120 is configured to selectively insert the reductant into the SCR catalyst 150 or upstream thereof (e.g., into the inlet conduit 102) or a mixer (not shown) positioned upstream of the SCR catalyst 150. The reductant insertion assembly 120 may comprise various structures to facilitate receipt of the reductant from the reductant storage tank 110 and delivery to the SCR catalyst 150.

In various embodiments, the reductant insertion assembly 120 may also include one or more pumps (e.g., a diaphragm pump, a positive displacement pump, a centrifugal pump, a vacuum pump, etc.) for delivering the reductant to the SCR catalyst 150 at an operating pressure and/or flow rate. The reductant insertion assembly 120 may also include filters and/or screens (e.g., to prevent solid particles of the reductant or contaminants from flowing into the one or pumps) and/or valves (e.g., check valves) to receive reductant from the reductant storage tank 110.

Screens, check valves, pulsation dampers, or other structures may also be positioned downstream of the one or more pumps of the reductant insertion assembly 120 and configured to remove contaminants and/or facilitate delivery of the reductant to the SCR catalyst 150. In various embodiments, the reductant insertion assembly 120 may also comprise a bypass line structured to provide a return path of the reductant from the one or more pumps to the reductant storage tank 110.

A valve (e.g., an orifice valve) may be provided in the bypass line. The valve may be structured to allow the reductant to pass therethrough to the reductant storage tank 110 if an operating pressure of the reductant generated by the one or more pumps exceeds a predetermined pressure so as to prevent over pressurizing of the pump, the reductant delivery lines, or other components of the reductant insertion assembly 120. In some embodiments, the bypass line may be configured to allow the return of the reductant to the reductant storage tank 110 during purging of the reductant insertion assembly 120 (e.g., after the aftertreatment system 100a is shut OFF).

In various embodiments, the reductant insertion assembly 120 may also comprise a blending chamber structured to receive pressurized reductant from a metering valve at a controllable rate. The blending chamber may also be structured to receive air (e.g., compressed air or portion of the exhaust gas), or any other inert gas (e.g., nitrogen), for example, from an air supply unit so as to deliver a combined flow of the air and the reductant to the SCR catalyst 150 through the reductant port 156.

The aftertreatment system 100a may also comprise a reductant injector fluidly coupled to the reductant insertion assembly 120 and configured to insert the reductant (e.g., a combined flow of reductant and compressed air) into the SCR catalyst 150. In various embodiments, the reductant injector may comprise a nozzle having predetermined diameter. In various embodiments, the reductant injector may be positioned in the reductant port 156 and structured to deliver a stream or a jet of the reductant into the internal volume of the housing 130 so as to deliver the reductant to the SCR catalyst 150.

In various embodiments, the reductant insertion assembly 120 may also comprise a dosing valve, for example positioned within a reductant delivery line for delivering the reductant from the reductant insertion assembly 120 to the SCR catalyst 150. The dosing valve can comprise any suitable valve, for example a butterfly valve, a gate valve, a check valve (e.g., a tilting disc check valve, a swing check valve, an axial check valve, etc.), a ball valve, a spring loaded valve, an air assisted injector, a solenoid valve, or any other suitable valve. The dosing valve may be selectively opened to insert a predetermined quantity of the reductant for a predetermined time into the SCR catalyst 150 or upstream therefrom.

A delta pressure sensor 160 is positioned across the filter 140 on the housing 130. The delta pressure sensor 160 includes an inlet port 162 or high port positioned upstream of the filter 140 and an outlet port 164 or low port positioned downstream of the filter 140. The inlet port 162 is configured to receive exhaust gas from near an inlet of the filter 140 and determine an inlet apparent pressure value upstream of the filter 140. Furthermore, the outlet port 164 is configured to receive the exhaust gas from near an outlet of the filter 140 and determine an outlet apparent pressure value downstream of the filter 140.

As previously described herein, conventional delta pressure sensors include an onboard controller, which is generally much more rudimentary, lacking the memory and processing power of the controller 170, and is therefore, much slower than the controller 170. The onboard controller is configured to determine the differential pressure across a filter (e.g., the filter 140) from the inlet gauge pressure value and the outlet gauge pressure value. Furthermore, conventional delta pressure sensors also include an ambient port defined in a sensor housing thereof which is configured to communicate ambient air into the sensor housing so as to allow an ambient pressure sensor positioned within the sensor housing to receive the ambient air and determine ambient or atmospheric pressure. The atmospheric pressure is used by the onboard controller to determine a relative inlet exhaust pressure value and/or the relative outlet exhaust pressure value based on the inlet gauge pressure value and the outlet gauge pressure value. While a sensor filter and a desiccant seal or gel are used to prevent dust and moisture from entering such conventional delta pressure sensors through the ambient port, the sensor filter and desiccant seal are prone to failure due to clogging or exposure to the high temperature exhaust gas. Thus, conventional delta pressure sensors have to be mounted at specific mounting orientation so as to prevent exposure to the exhaust gas.

Figure 3:
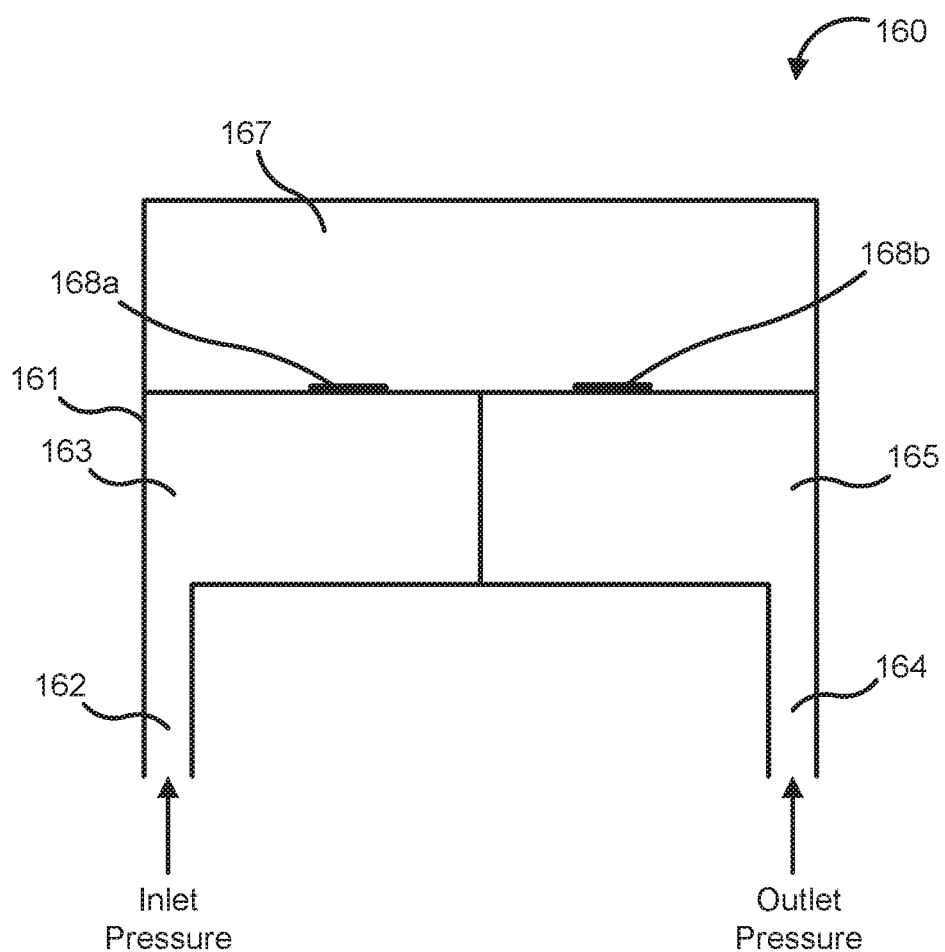
FIG. 3 is a schematic illustration of a delta pressure sensor included in the aftertreatment system of FIG. 1A or 1B, according to an embodiment.

In contrast, the delta pressure sensor 160 does not include an ambient pressure port. Therefore, the possibility of dust, moisture and/or hot exhaust gas from entering a sensor housing of the delta pressure sensor 160 is substantially lower than conventional delta pressure sensors. FIG. 3 is a more detailed schematic illustration of the delta pressure sensor 160, according to an embodiment. The delta pressure sensor 160 includes a housing 161 comprising a first front volume 163, a second front volume 165 and a back volume 167 which are fluidly isolated from each other. The inlet port 162 is fluidly coupled to the first front volume 163 and the outlet port 164 is fluidly coupled to the second front volume 165 such that the first front volume 163 receives the exhaust gas from upstream of the filter 140 and the second front volume 165 receives exhaust gas from downstream of the filter 140.

A first diaphragm 168a is disposed in a sidewall of housing 161 separating the first front volume 163 from the back volume 167, and a second diaphragm 168b is disposed in a sidewall of the housing 161 separating the second front volume 165 from the back volume 167. The first diaphragm 168a and the second diaphragm 168b are configured to measure the inlet apparent pressure value and outlet apparent pressure value, respectively relative to the pressure of the volume of air present in the back volume 167. In some embodiments, the back volume 167 may be at atmospheric pressure such that the inlet and outlet apparent pressures represent inlet and outlet gauge pressures. For example, one or more sidewalls of the back volume 167 may have sufficient compliance so that the any changes in outside atmospheric pressure results in a proportional change in the back volume pressure such that the back volume is at atmospheric pressure. In other embodiments, the back volume 167 may be at vacuum such that the inlet and outlet apparent pressures represent inlet and outlet absolute pressures.

In conventional delta pressure sensors, an ambient port is defined in a sidewall of the back volume 167 so such that the back volume 167 and the first diaphragm 168a and the second diaphragm 168b measure an inlet gauge pressure value and the outlet gauge pressure value, respectively. As previously described herein, the ambient port makes such conventional delta pressure sensors prone to failure.

In contrast, the delta pressure sensor 160 does not include an ambient port defined in the back volume 167. Thus, the delta pressure sensor 160 is significantly more robust and less prone to failure than conventional delta pressure sensors. Furthermore, instead of an onboard controller of the delta pressure sensor 160 determining the various pressures as is the case with conventional delta pressure sensors, the controller 170 is configured to receive the inlet apparent pressure value and outlet apparent pressure value from the delta pressure sensor 160 and determine the various pressures values, as described in further detail herein. The controller 170 may have much higher processing power and/or memory than the onboard controller of the delta pressure sensor 160 and therefore allow faster processing and faster determination of the various pressure values. Thus, the onboard controller of the delta pressure sensor 160 may include a data logger for storing the inlet and outlet apparent pressure values and/or a simple communication interface for communicating the inlet and outlet apparent pressure values to the controller 170.

The ambient pressure value which is used to determine relative inlet and outlet exhaust pressure values is determined using an ambient pressure sensor 166 separate from the delta pressure sensor 160. The ambient pressure sensor 166 is configured to measure an ambient pressure value of an ambient environment in which the aftertreatment system 100a is located. The ambient pressure sensor 166 may comprise an engine air inlet pressure sensor, a turbocharger inlet air pressure sensor, a dedicated ambient pressure sensor or any other pressure sensor included in the aftertreatment system 100a, or an equipment (e.g., a vehicle) including the aftertreatment system 100a. Furthermore, differential pressure value and relative inlet and outlet exhaust pressure values may be determined by the controller 170 instead of an onboard controller of the first and second pressure sensors, as described with respect to the delta pressure sensor 160.

Figure 1B:
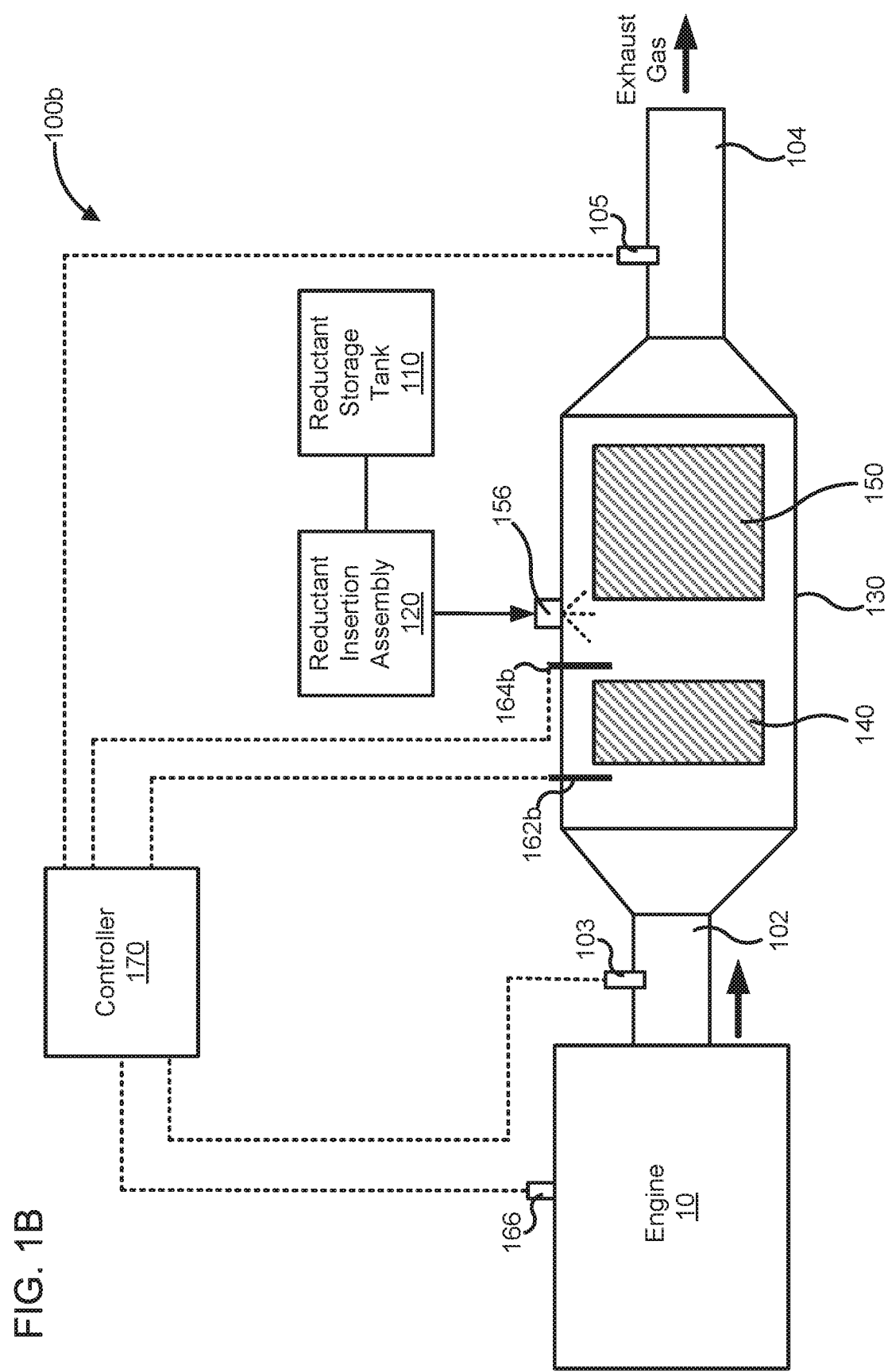
FIG. 1B is a schematic illustration of an aftertreatment system, according to another embodiment.

While FIG. 1A shows a delta pressure sensor 160, in other embodiments, the aftertreatment system 100a may comprise a first apparent pressure sensor positioned upstream of the filter 140 and configured to determine the inlet apparent pressure value, and a second apparent pressure sensor positioned downstream of the filter 140 and configured to determine the outlet apparent pressure value. The first and second pressure sensors may include gauge pressure sensors that do not include an ambient pressure port that is generally present in conventional gauge pressure sensors. For example FIG. 1B shows an aftertreatment system 100b, according to another embodiment. The aftertreatment system 100b is substantially similar to the aftertreatment system 100a, but instead of the differential pressure sensor 160, the aftertreatment system 100b includes a first apparent pressure sensor 162a positioned upstream of the filter 140 an configured to measure an inlet apparent pressure value, and a second apparent pressure sensor 164b positioned downstream of the filter 140 and configured to measure an outlet apparent pressure value.

The controller 170 may be communicatively coupled to the first sensor 103 and may be configured to receive a first sensor signal from the first sensor 103, for example, to determine an amount of NOx gases and/or an exhaust flow rate of the exhaust gas flowing into the SCR catalyst 150. The controller 170 may also be communicatively coupled to the second sensor 105 and may be configured to determine an amount of NOx gases, or ammonia included in the exhaust gas being expelled into the environment. In some embodiments, the controller 170 may also be communicatively coupled to the engine 10 and configured to determine one or more engine operating parameters (e.g., engine speed, engine torque, exhaust gas flow rate, fuel insertion rate, intake air flow rate, etc.) associated with the engine 10. In various embodiments, the controller 170 may be configured to determine a desired flow rate value of the reductant into the SCR catalyst 150 based on an amount of NOx gases and/or an exhaust flow rate of the exhaust gas flowing into the SCR catalyst 150, and/or one or more engine operating parameter. The desired reductant flow rate may correspond to an amount of reductant which may optimally reduce the amount of NOx gases in the exhaust gas (e.g., greater than 99% of the amount of NOx gases in the exhaust gas), and cause minimum ammonia slip.

The controller 170 is communicatively coupled to the delta pressure sensor 160 and the ambient pressure sensor 166. The controller 170 may be operably coupled to the delta pressure sensor 160, the ambient pressure sensor 166, the first sensor 103, the second sensor 105 and/or the engine 10 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

The controller 170 may be configured to receive the inlet apparent pressure value from the delta pressure sensor 160. The controller 170 is also configured to receive the ambient pressure value from the ambient pressure sensor 166. The controller 170 may be configured to determine a relative exhaust pressure value based on the inlet apparent pressure value and the ambient pressure value. The relative inlet exhaust pressure value may comprise a difference between the inlet apparent pressure value and the ambient pressure value. The controller 170 may also be configured to adjust a flow rate of the exhaust gas based at least on the relative inlet exhaust pressure value. For example, the controller 170 may be communicatively coupled to the engine 10 and configured to adjust an intake air flow rate, an engine speed, an engine torque, an exhaust gas recirculation valve, exhaust flow rate valve, or any other engine parameter so as to control the exhaust flow rate.

The controller 170 may also be configured to receive the outlet apparent pressure value from the delta pressure sensor 160. The controller 170 may determine a relative outlet exhaust pressure value based on the outlet apparent pressure value and the ambient pressure value. For example, the relative outlet exhaust pressure value may include a difference between the outlet apparent pressure value and the ambient pressure value. In some embodiments, the controller 170 may be configured to adjust the exhaust flow rate based also on the relative outlet exhaust pressure value. With reference to FIG. 1B, the controller 170 may be operably coupled to the first apparent pressure sensor 162b and the second apparent pressure sensor 164b and receive the inlet apparent pressure value and the outlet apparent pressure value therefrom, respectively for determining the relative inlet and outlet pressure values.

The controller 170 may also be configured to determine a differential pressure value across the filter 140 based on the inlet outlet pressure value and the outlet apparent pressure value. For example, the differential pressure value may comprise a difference between the inlet apparent pressure value and the outlet apparent pressure value. The differential pressure value indicates a pressure drop across the filter 140 which may be indicative of a particulate matter loading on the filter 140 or otherwise an amount of clogging of the filter 140. In some embodiments, the controller 170 may be configured to generate a fault code in response to the differential pressure value being greater than a predetermined differential pressure threshold value (i.e., the pressure drop across the filter 140 being greater than the predetermined differential pressure threshold value). The fault code may be indicative of the filter 140 being clogged.

In some embodiments, the fault code may prompt a user to change the filter 140. In other embodiments, the controller 170 may be configured to adjust one or more engine operating parameters (e.g., adjusting fuel insertion timing or fuel/air ratio) so as to increase a temperature of the exhaust gas to a regeneration temperature (e.g., approximately 600 degrees Celsius) sufficient to burn off the accumulated soot and organic material in the filter 140 so as to regenerate the filter 140. In other embodiments, the aftertreatment system 100a may also include a hydrocarbon insertion assembly (not shown) and the controller 170 may be configured to command the hydrocarbon insertion assembly to insert hydrocarbons into the exhaust gas upstream of the filter 140 responsive to the differential pressure value being greater than the predetermined differential pressure threshold value. The inserted hydrocarbons may combust in the hot exhaust gas so as to raise the temperature of the exhaust gas to the regeneration temperature. In still other embodiments, the filter 140 may include one or more heating elements (e.g., resistive coils or wires). The controller 170 may be configured to activate the heating element so as to increase the temperature of the filter 140 to the regeneration temperature.

In particular embodiments, the controller 170 may also be configured to determine if the differential pressure value is less than a predetermined low pressure threshold value. In response to differential pressure value being less than the predetermined low pressure threshold value, the controller 170 may generate a second fault code indicative of the filter 140 being cracked. For example, the filter 140 may be structured to provide a minimum pressure drop thereacross (e.g., having a value greater than zero), even when the filter 140 is fresh or first installed. A crack in the filter will allow the exhaust gas to pass through the filter 140 with very little or no resistance causing the differential pressure value to drop below the predetermined low pressure threshold value (e.g., a differential pressure value being approximately zero). In such situations the controller 170 may generate the second fault code alerting the user to change the filter 140.

In some embodiments, the controller 170 may also be configured to control the exhaust flow rate based also on the differential pressure value. For example, as the filter 140 gets progressively clogged, a backpressure exerted by the filter 140 on the exhaust gas continues to increase. Continuing to maintain a high flow rate on a clogged filter 140 may exert a high stress on the filter 140 which may lead to cracking of the filter 140. Therefore, the controller 170 may adjust the exhaust flow rate (e.g., reduce the exhaust flow rate) so as to prevent damage to the filter 140.

Figure 2:
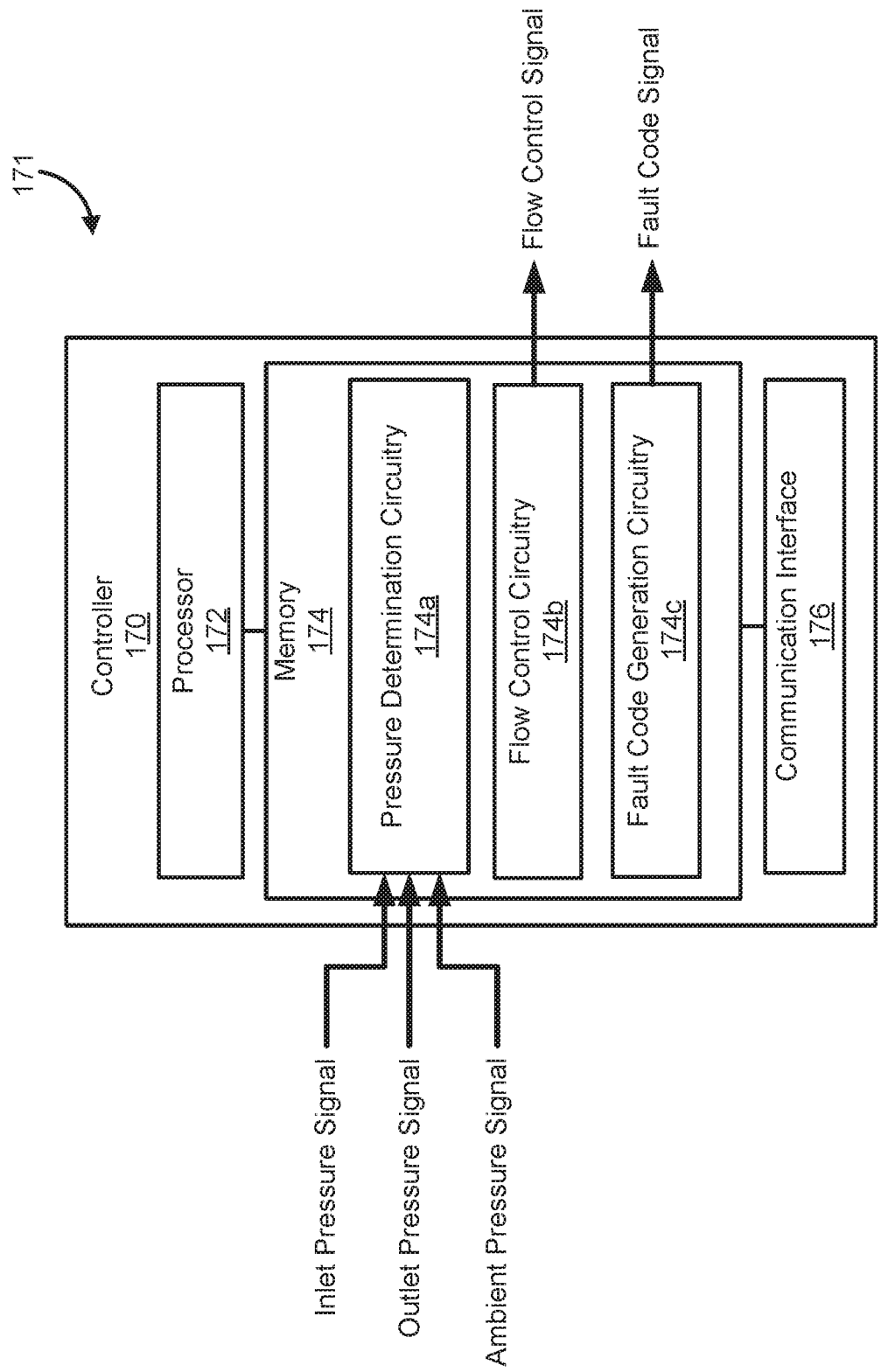
FIG. 2 is a schematic block diagram of an embodiment of control circuitry that may be included in the aftertreatment system of FIG. 1A or 1B.

In particular embodiments, the controller 170 may be included in a control circuitry. For example, FIG. 2 is a schematic block diagram of a control circuitry 171 that comprises the controller 170, according to an embodiment. The controller 170 comprises a processor 172, a memory 174, or any other computer readable medium, and a communication interface 176. Furthermore, the controller 170 includes a pressure determination circuitry 174a, a flow control circuitry 174b and a fault code generation circuitry 174c. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the pressure determination circuitry 174a, the flow control circuitry 174b and the fault code generation circuitry 174c are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the pressure determination circuitry 174a, the flow control circuitry 174b and the fault code generation circuitry 174c are embodied as hardware units, such as electronic control units. As such, the pressure determination circuitry 174a, the flow control circuitry 174b and the fault code generation circuitry 174c may be embodied as one or more circuitry components including, but not limited to, processing circuitry, network interfaces, peripheral devices, input devices, output devices, sensors, etc.

In some embodiments, the pressure determination circuitry 174a, the flow control circuitry 174b and the fault code generation circuitry 174c may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the pressure determination circuitry 174a, the flow control circuitry 174b and the fault code generation circuitry 174c may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the pressure determination circuitry 174a, the flow control circuitry 174b and the fault code generation circuitry 174c may also include programmable hardware devices such as field programmable gate arrays, programmable array logic, programmable logic devices or the like. In this regard, the pressure determination circuitry 174a, the flow control circuitry 174b and the fault code generation circuitry 174c may include one or more memory devices for storing instructions that are executable by the processor(s) of the pressure determination circuitry 174a, the flow control circuitry 174b and the fault code generation circuitry 174c. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect the pressure determination circuitry 174a, the flow control circuitry 174b and the fault code generation circuitry 174c. Thus, the depicted configuration represents the aforementioned arrangement where the pressure determination circuitry 174a, the flow control circuitry 174b and the fault code generation circuitry 174c are embodied as machine or computer-readable media. However, as mentioned above, this illustration is not meant to be limiting as the present disclosure contemplates other embodiments such as the aforementioned embodiment where the pressure determination circuitry 174a, the flow control circuitry 174b and the fault code generation circuitry 174c, or at least one circuit of the pressure determination circuitry 174a, the flow control circuitry 174b and the fault code generation circuitry 174c are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the pressure determination circuitry 174a, the flow control circuitry 174b and the fault code generation circuitry 174c) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the first sensor 103, the second sensor 105, the engine 10, the delta pressure sensor 160 and the ambient pressure sensor 166. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The pressure determination circuitry 174a may be configured to receive an inlet pressure signal indicative of the inlet apparent pressure value and an outlet pressure signal indicative of the outlet apparent pressure value from the delta pressure sensor 160, and an ambient pressure signal indicative of the ambient pressure value from the ambient pressure sensor 166. The pressure determination circuitry 174a may be configured to determine the relative inlet exhaust pressure value based on the inlet apparent pressure value and the ambient pressure value (e.g., a difference between the inlet apparent and ambient pressure values). The pressure determination circuitry 174a may also be configured to determine the relative outlet exhaust pressure value based on the outlet apparent pressure value and the ambient pressure value (e.g., a difference between the outlet apparent and ambient pressure values). Furthermore, the pressure determination circuitry 174a may also be configured to determine the differential pressure value based on the inlet and outlet apparent pressure values (e.g., a difference between the inlet and outlet apparent pressure values).

The flow control circuitry 174b is configured to generate a flow control signal configured to adjust a flow rate of the exhaust gas through the aftertreatment system 100a. For example, the flow control circuitry 174b may be configured to adjust the exhaust flow rate based on at least one of the relative inlet exhaust pressure value, the relative outlet exhaust pressure value or the differential pressure value. The flow control circuitry 174b may adjust the exhaust flow rate, for example, by adjusting one or more engine operating parameters of the engine 10 (e.g., an intake air volume or flow rate, a fuel/air ratio, and engine speed or torque, etc.), an exhaust gas recirculation valve or an exhaust flow valve.

The fault code generation circuitry 174c is configured to generate a fault code signal based on the differential pressure value. For example, in response to the differential pressure value being greater than a predetermined differential pressure threshold value, the fault code generation circuitry 174c may generate the fault code signal configured to transmit a fault code to the user indicative of the filter 140 being clogged. In other embodiments, in response to the differential pressure value being less than a predetermined low pressure threshold value, the fault code generation circuitry 174c may generate a second fault code signal configured to transmit a second fault code to the user indicative of the filter 140 being cracked or otherwise broken, as previously described herein.

Figure 4B:
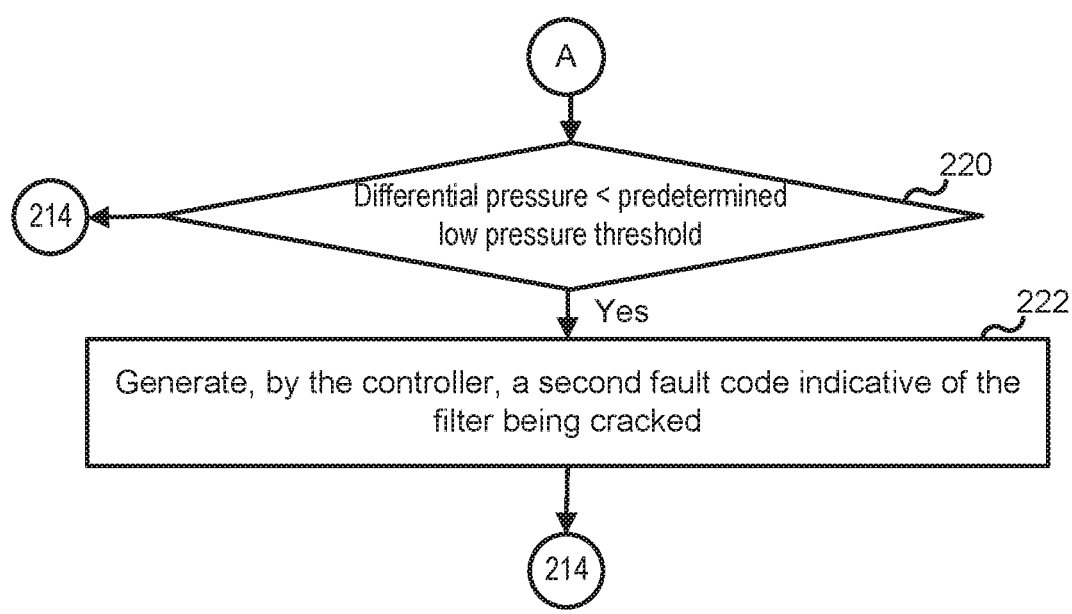

FIGS. 4A-B illustrate a schematic flow diagram of an example method 200 for determining various pressure values of an exhaust gas flowing through a filter (e.g., the filter 140) of an aftertreatment system (e.g., the aftertreatment system 100a/b). The aftertreatment system includes a delta pressure sensor (e.g., the delta pressure sensor 160) which may be positioned on a housing (e.g., the housing 130) of the aftertreatment system across the filter (e.g., the filter 140). While method 200 is described herein as being implemented with the controller 170, it should be understood the method 200 may be implemented with any controller included in any aftertreatment system.

The method 200 includes receiving, by the controller 170 (e.g., the pressure determination circuitry 174a) from the delta pressure sensor 160, an inlet apparent pressure value upstream of the filter 140, at 202. For example, the inlet apparent pressure value may include a pressure value of the exhaust gas measured at the inlet port 162 of the delta pressure sensor 160. At 204, the controller 170 (e.g., the pressure determination circuitry 174a) may also receive an outlet apparent pressure value downstream of the filter 140 from the delta pressure sensor 160. For example, the outlet apparent pressure value may include a pressure value of the exhaust gas measured at the outlet port 164 of the delta pressure sensor 160.

At 206, the controller 170 (e.g., the pressure determination circuitry 174a) receives an ambient pressure value from the ambient sensor 166 which is separate from the delta pressure sensor 160. As previously described herein, the delta pressure sensor 160 does not include an ambient port which increases the reliability and lifetime of the delta pressure sensor 160.

At 208, the controller 170 (e.g., the pressure determination circuitry 174a) determines a relative inlet exhaust pressure value based on the inlet apparent pressure value and the ambient pressure value. For example, the pressure determination circuitry 174a may determine a difference between the inlet apparent pressure value and the ambient pressure value, the difference corresponding to the relative inlet exhaust pressure value.

At 210, the controller 170 (e.g., the pressure determination circuitry 174a) may determine a relative outlet exhaust pressure value based on the outlet exhaust pressure value and the ambient pressure value. For example, the pressure determination circuitry 174a may determine a difference between the outlet apparent pressure value and the ambient pressure value, the difference corresponding to the relative outlet exhaust pressure value.

At 212, the controller 170 (e.g., the pressure determination circuitry 174a) may also determine a differential pressure value based on the inlet apparent pressure value and the outlet apparent pressure value. For example, the pressure determination circuitry 174a may determine a difference between the inlet apparent pressure value and the outlet apparent pressure value which corresponds to the differential pressure value. At 214, the controller 170 (e.g., the flow control circuitry 174b) may adjust an exhaust flow rate of the exhaust gas based on at least the relative inlet exhaust pressure value. For example, the flow control circuitry 174b may adjust the exhaust flow rate based on the relative inlet exhaust pressure value, and the relative outlet exhaust pressure value and/or the delta pressure sensor value.

At 216, the controller 170 (e.g., the pressure determination circuitry 174a) determines if the differential pressure value is greater than a predetermined differential pressure threshold value. If the differential pressure value is less than the predetermined differential pressure threshold value, the method 200 returns to operation 214. In response to the differential pressure value being greater than the predetermined differential pressure threshold value, the controller 170 (e.g., the fault code generation circuitry 174c) may generate a fault code, at 218, the fault code indicative of the filter 140 being clogged. The fault code may be configured to indicate to a user to change the filter 140. In other embodiments, the controller 170 may be configured to regenerate the filter 140 (e.g., command a hydrocarbon insertion assembly to insert hydrocarbons into the exhaust gas, adjust an air/fuel ratio or combustion timing of the engine, or activate one or more heating elements operably coupled to the filter 140 so as to regenerate the filter 140).

At 220, the controller 170 (e.g., the pressure determination circuitry 174a) determines if the differential pressure value is less than a predetermined low pressure threshold value. If the differential pressure value is greater than the predetermined low pressure threshold value, the method 200 returns to operation 214. In response to the differential pressure value being less than a predetermined low pressure threshold value (e.g., approximately zero), the controller 170 may determine that the filter 140 is cracked as previously described herein, and generate a second fault code indicative of the filter 140 being cracked. The second fault code may be configured to light up a malfunction indicator lamp (MIL) or any other malfunction indicator (e.g., filter change indicator provided on vehicle console or dashboard) configured to inform the user that the filter 140 has cracked and should be changed.

Figure 5:
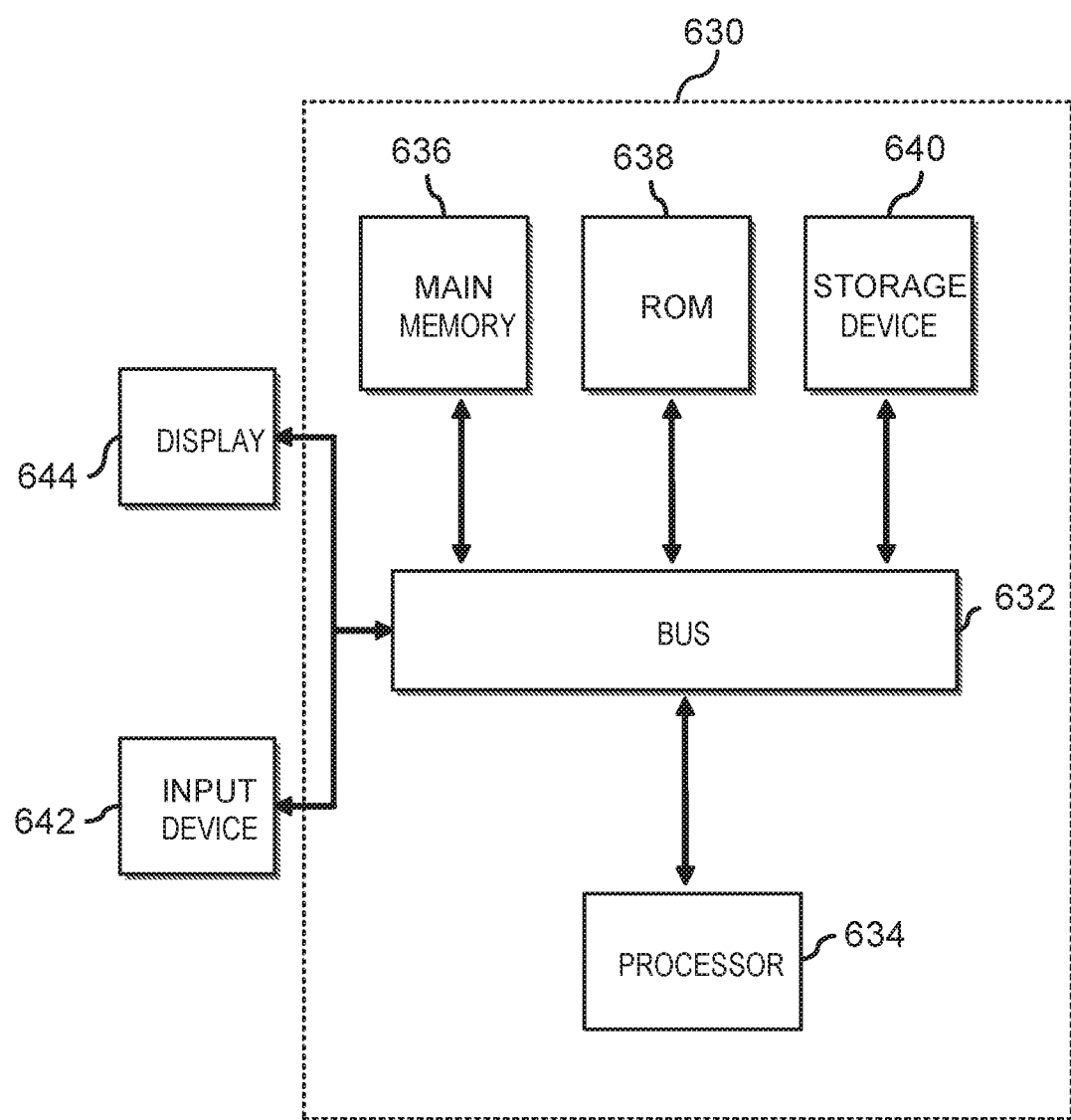
FIG. 5 is a schematic block diagram of a computing device which may be used as the controller shown in FIG. 1A or 1B and/or 2.

In some embodiments, the controller 170, the control circuitry 171, or any of the controller or control circuitries described herein can comprise a system computer of an apparatus or system which comprises the aftertreatment system 100a/b (e.g., a vehicle, an engine or generator set, etc.). For example, FIG. 5 is a block diagram of a computing device 630 in accordance with an illustrative implementation. The computing device 630 can be used to perform any of the methods or the processes described herein, for example, the method 200. In some embodiments, the controller 170 can comprise the computing device 630. The computing device 630 comprises a bus 632 or other communication component for communicating information. The computing device 630 can also comprise one or more processors 634 or processing circuits coupled to the bus 632 for processing information.

The computing device 630 also comprises main memory 636, such as a random access memory (RAM) or other dynamic storage device, coupled to the bus 632 for storing information and instructions to be executed by the processor 634. Main memory 636 can also be used for storing position information, temporary variables, or other intermediate information during execution of instructions by the processor 634. The computing device 630 may further comprise ROM 638 or other static storage device coupled to the bus 632 for storing static information and instructions for the processor 634. A storage device 640, such as a solid-state device, magnetic disk or optical disk, is coupled to the bus 632 for persistently storing information and instructions. For example, instructions corresponding operations of the method 300 can be stored on the storage device 640.

The computing device 630 may be coupled via the bus 632 to a display 644, such as a liquid crystal display or active matrix display, for displaying information to a user. An input device 642, such as a keyboard or alphanumeric pad, may be coupled to the bus 632 for communicating information and command selections to the processor 634. In another implementation, the input device 642 has a touch screen display 644.

According to various implementations, the methods described herein can be implemented by the computing device 630 in response to the processor 634 executing an arrangement of instructions contained in main memory 636 (e.g., the operations of the method 200). Such instructions can be read into main memory 636 from another non-transitory computer-readable medium, such as the storage device 640. Execution of the arrangement of instructions contained in main memory 636 causes the computing device 630 to perform the illustrative processes described herein. One or more processors in a multi-processing arrangement may also be employed to execute the instructions contained in main memory 636. In alternative implementations, hard-wired circuitry may be used in place of or in combination with software instructions to effect illustrative implementations. Thus, implementations are not limited to any specific combination of hardware and software.

Although an example computing device has been described in FIG. 4, implementations described in this specification can be implemented in other types of digital electronic, or in computer software, firmware, or hardware, including the structures disclosed in this specification and their structural equivalents, or in combinations of one or more of them.

Implementations described in this specification can be implemented in digital electronic, or in computer software, firmware, or hardware, including the structures disclosed in this specification and their structural equivalents, or in combinations of one or more of them. The implementations described in this specification can be implemented as one or more computer programs (i.e., one or more circuitries of computer program instructions) encoded on one or more computer storage media for execution by, or to control the operation of, data processing apparatus. A computer storage medium comprises a non-transitory computer readable medium and can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple disks, or other storage devices). Accordingly, the computer storage medium is both tangible and non-transitory.

The operations described in this specification can be performed by a data processing apparatus on data stored on one or more computer-readable storage devices or received from other sources. The term "data processing apparatus" or "computing device" encompasses all kinds of apparatus, devices, and machines for processing data, including, by way of example, a programmable processor, a computer, a system on a chip, or multiple ones, or combinations of the foregoing. The apparatus can comprise special purpose logic, e.g., an FPGA (field programmable gate array) or an ASIC (application-specific integrated circuit). In addition to hardware, the apparatus can also comprise code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a circuitry, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuitries, sub-programs, or portions of code). A computer program can be deployed to be executed on one computer, on multiple computers that are located at one site, or distributed across multiple sites and interconnected by a communication network.

Processors suitable for the execution of a computer program comprise, by way of example, both general and special purpose microprocessors and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also comprise, or be operatively coupled to receive data from or transfer data to, or both, one or more mass storage devices for storing data (e.g., magnetic, magneto-optical disks, or optical disks). However, a computer need not have such devices. Devices suitable for storing computer program instructions and data comprise all forms of non-volatile memory, media and memory devices, including, by way of example, semiconductor memory devices (e.g., EPROM, EEPROM, and flash memory devices) or magnetic disks (e.g., internal hard disks or removable disks). The processor and the memory can be supplemented by, or incorporated in, special purpose logic.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As utilized herein, the terms "substantially' and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

As used herein, the term "approximately" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. An aftertreatment system configured to reduce constituents of an exhaust gas produced by an engine, comprising:
    a housing defining an internal volume, the housing having an inlet configured to receive the exhaust gas and an outlet configured to expel treated exhaust gas;
    a filter disposed in the housing, the filter configured to remove particulate matter included in the exhaust gas;
    a delta pressure sensor configured to measure an inlet apparent pressure value of the exhaust gas upstream of the filter and an outlet apparent pressure value of the exhaust gas downstream of the filter;
    an ambient pressure sensor separate from the delta pressure sensor, the ambient pressure sensor configured to measure an ambient pressure value of an ambient environment within which the aftertreatment system is located; and
    a controller communicatively coupled to the delta pressure sensor and the ambient pressure sensor, the controller configured to:
        receive the inlet apparent pressure value from the delta pressure sensor,
        receive the outlet apparent pressure value from the delta pressure sensor,
        receive the ambient pressure value from the ambient pressure sensor,
        determine a relative inlet exhaust pressure value based upon the inlet apparent pressure value and the ambient pressure value,
        determine a relative outlet exhaust pressure value based upon the outlet apparent pressure value and the ambient pressure value, and
        adjust an exhaust flow rate of the exhaust gas based at least on the relative inlet exhaust pressure value and the relative outlet exhaust pressure value.

2. The aftertreatment system of claim 1, wherein the relative inlet exhaust pressure value comprises a difference between the inlet apparent pressure value and the ambient pressure value.

3. The aftertreatment system of claim 1, wherein the relative outlet exhaust pressure value comprises a difference between the outlet apparent pressure value and the ambient pressure value.

4. The aftertreatment system of claim 1, wherein the ambient pressure sensor comprises an engine inlet air pressure sensor or a turbocharger inlet air pressure sensor.

5. The aftertreatment system of claim 1, wherein the controller is further configured to determine a differential pressure value across the filter based on a difference between the inlet apparent pressure value and the outlet apparent pressure value.

6. The aftertreatment system of claim 5, wherein the controller is configured to adjust the exhaust flow rate of the exhaust gas based also on the differential pressure value.

7. The aftertreatment system of claim 5, wherein the controller is further configured to generate a fault code in response to the differential pressure value being greater than a predetermined differential pressure threshold value, the fault code indicative of the filter being clogged.

8. A pressure determination system, comprising:
    a delta pressure sensor configured to be positioned on an aftertreatment system comprising at least a filter, the delta pressure sensor configured to measure an inlet apparent pressure value of an exhaust gas upstream of the filter and an outlet apparent pressure value of the exhaust gas downstream of the filter;
    an ambient pressure sensor separate from the delta pressure sensor, the ambient pressure sensor configured to measure an ambient pressure value of an ambient environment within which the aftertreatment system is located; and
    a controller communicatively coupled to the delta pressure sensor and the ambient pressure sensor, the controller configured to:
        receive the inlet apparent pressure value from the delta pressure sensor,
        receive the outlet apparent pressure value from the delta pressure sensor,
        receive the ambient pressure value from the ambient pressure sensor,
        determine a relative inlet exhaust pressure value based upon the inlet apparent pressure value and the ambient pressure value,
        determine a relative outlet exhaust pressure value based upon the outlet apparent pressure value and the ambient pressure value, and
        adjust an exhaust flow rate of the exhaust gas based at least on the relative inlet exhaust pressure value and the relative outlet exhaust pressure value.

9. The pressure determination system of claim 8, wherein the relative inlet exhaust pressure value comprises a difference between the inlet apparent pressure value and the ambient pressure value.

10. The pressure determination system of claim 8, wherein the relative outlet exhaust pressure value comprises a difference between the outlet apparent pressure value and the ambient pressure value.

11. The pressure determination system of claim 8, wherein the controller is further configured to determine a differential pressure value across the filter based on a difference between the inlet apparent pressure value and the outlet apparent pressure value.

12. The pressure determination system of claim 11, wherein the controller is configured to adjust the exhaust flow rate of the exhaust gas based also on the differential pressure value.

13. The pressure determination system of claim 11, wherein the controller is further configured to generate a fault code in response to the differential pressure value being greater than a predetermined differential pressure threshold value, the fault code indicative of the filter being clogged.

14. A method for determining various pressures of an exhaust gas flowing through an aftertreatment system that comprises a filter and a delta pressure sensor, the method comprising:
receiving, by a controller from the delta pressure sensor, an inlet apparent pressure value of the exhaust gas upstream of the filter;
receiving, by the controller from the delta pressure sensor, an outlet apparent pressure value of the exhaust gas downstream of the filter;
receiving, by the controller from an ambient pressure sensor, an ambient pressure value of an ambient environment within which the aftertreatment system is located;
determining, by the controller, a relative inlet exhaust pressure value based upon the inlet apparent pressure value and the ambient pressure value;
determining, by the controller, a relative outlet exhaust pressure value based upon the outlet apparent pressure value and the ambient pressure value; and
adjusting, by the controller, an exhaust flow rate of the exhaust gas based at least on the relative inlet exhaust pressure value and the relative outlet exhaust pressure value.

15. The method of claim 14, wherein the relative inlet exhaust pressure value comprises a difference between the inlet apparent pressure value and the ambient pressure value.

16. The method of claim 14, wherein the relative outlet exhaust pressure value comprises a difference between the outlet apparent pressure value and the ambient pressure value.

17. The method of claim 14, further comprising determining, by the controller, a differential pressure value across the filter based upon the inlet apparent pressure value and the outlet apparent pressure value, wherein the exhaust flow rate is adjusted based also on the differential pressure value.

18. The method of claim 17, further comprising:
determining, by the controller, that the differential pressure value is greater than a predetermined differential pressure threshold value; and
generating, by the controller, a fault code indicative of the filter being clogged.

19. A pressure determination system, comprising:
a first apparent pressure sensor positioned upstream of a filter of an aftertreatment system and configured to measure an inlet apparent pressure value of an exhaust gas upstream of the filter;
a second apparent pressure sensor positioned downstream of the filter and configured to measure an outlet apparent pressure value of the exhaust gas downstream of the filter;
an ambient pressure sensor separate from the first apparent pressure sensor and configured to measure an ambient pressure value of an ambient environment within which the aftertreatment system is located; and
a controller communicatively coupled to the first apparent pressure sensor and the ambient pressure sensor, the controller configured to:
receive the inlet apparent pressure value from the first apparent pressure sensor,
receive the outlet apparent pressure value from the second apparent pressure sensor, and
receive the ambient pressure value from the ambient pressure sensor,
determine a relative inlet exhaust pressure value based upon the inlet apparent pressure value and the ambient pressure value,
determine a relative outlet exhaust pressure value based upon the outlet apparent pressure value and the ambient pressure value, and
adjust an exhaust flow rate of the exhaust gas based at least on the relative inlet exhaust pressure value and the relative outlet exhaust pressure value.

20. The pressure determination system of claim 19, wherein the controller is further configured to determine a differential pressure value across the filter based on a difference between the inlet apparent pressure value and the outlet apparent pressure value.

* * * * *